US012567175B2

(12) United States Patent
Laroia et al.

(10) Patent No.: US 12,567,175 B2
(45) Date of Patent: Mar. 3, 2026

(54) METHODS AND APPARATUS FOR SUPPORTING REAL TIME CAMERA CALIBRATION AND/OR CAMERA POSITION CALIBRATION TO FACILITATE STEREOSCOPIC DEPTH DETERMINATION AND/OR APPARATUS CONTROL

(71) Applicant: Deere & Company, Moline, IL (US)

(72) Inventors: Rajiv Laroia, Far Hills, NJ (US); Pablo Anigstein, Palo Alto, CA (US); Daniel Gotsch, Newark, CA (US); Atul Maharshi, South Orange, NJ (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/577,894

(22) PCT Filed: Jul. 9, 2022

(86) PCT No.: PCT/US2022/036596
§ 371 (c)(1),
(2) Date: Jan. 9, 2024

(87) PCT Pub. No.: WO2023/287668
PCT Pub. Date: Jan. 19, 2023

(65) Prior Publication Data
US 2024/0331199 A1      Oct. 3, 2024

Related U.S. Application Data

(60) Provisional application No. 63/244,175, filed on Sep. 14, 2021, provisional application No. 63/220,464, filed on Jul. 10, 2021.

(51) Int. Cl.
*H04N 13/254*      (2018.01)
*G06T 7/593*      (2017.01)
(Continued)

(52) U.S. Cl.
CPC ................ *G06T 7/85* (2017.01); *G06T 7/593* (2017.01); *H04N 13/239* (2018.05);
(Continued)

(58) Field of Classification Search
CPC ......... G06T 7/85; G06T 7/593; H04N 13/254; H04N 13/271; H04N 13/239
(Continued)

(56) References Cited

U.S. PATENT DOCUMENTS 10,818,034 B1    10/2020  Gehrke et al.
2009/0033926 A1    2/2009  Haug
(Continued)

OTHER PUBLICATIONS

International Search Report and Written Opinion of the International Searching Authority from PCT/US2022/036596 dated Nov. 11, 2022, 16 pages.

*Primary Examiner* — Nguyen T Truong
(74) *Attorney, Agent, or Firm* — Straub & Straub; Michael P. Straub; Stephen T. Straub

(57) ABSTRACT

Calibration target(s) are mounted on a vehicle including a plurality of cameras. The calibration targets are in the field of view of the cameras. The calibration targets are sometimes LED or IR illumined targets. The targets in some embodiments are shielded to block light from oncoming cars and/or to block driver view of the target to reduce the risk of driver distraction. The cameras capture images at the same time. Calibration operations are then performed using the target or targets included in the captured images as a known visual reference of a known shape, size and/or having a known image pattern. Calibration parameters including parameters providing information about the location and/or spatial positions of the cameras with respect to each other and/or the target are generated from the captured images. Distance to objects in the environment which are included in the captured images are then determined.

30 Claims, 10 Drawing Sheets

(51) Int. Cl.

| | |
|---|---|
| *G06T 7/80* | (2017.01) |
| *H04N 13/239* | (2018.01) |
| *H04N 13/271* | (2018.01) |
| *H04N 13/00* | (2018.01) |

(52) U.S. Cl.
CPC ......... *H04N 13/254* (2018.05); *H04N 13/271* (2018.05); *G06T 2207/10048* (2013.01); *G06T 2207/30208* (2013.01); *G06T 2207/30252* (2013.01); *H04N 2013/0081* (2013.01)

(58) Field of Classification Search
USPC .......................................................... 348/47
See application file for complete search history.

(56) References Cited

U.S. PATENT DOCUMENTS

| | | | |
|---|---|---|---|
| 2015/0130951 A1 | 5/2015 | Olson et al. | |
| 2015/0145965 A1 | 5/2015 | Livyatan et al. | |
| 2020/0364892 A1 | 11/2020 | Ko et al. | |

4000

4001

METHODS AND APPARATUS FOR SUPPORTING REAL TIME CAMERA CALIBRATION AND/OR CAMERA POSITION CALIBRATION TO FACILITATE STEREOSCOPIC DEPTH DETERMINATION AND/OR APPARATUS CONTROL

FIELD

The present application relates to camera system calibration and/or determination of parameters relating to a stereoscopic camera system, e.g., parameters such as camera location and/or spacing parameters, which can be used to facilitate stereoscopic depth determinations and/or to controlling an apparatus such as a vehicle based on stereoscopic depth determinations.

BACKGROUND

Multiple cameras can be, and sometimes are, used to capture images which are then used to perform depth determinations, e.g., determine the distance to one or more objects from a camera used to capture an image of the objects.

Stereoscopic depth determinations often rely on information about the position and distance between cameras when making depth determinations. While relative camera positions and camera parameters are often measured at time of initial deployment, e.g., after installation of the cameras on a vehicle, vibrations, temperature changes and/or other movements can affect camera alignment and positioning.

In the case of cameras mounted on a moving vehicle, the frame to frame changes in camera position can affect the ability to determine and assign depth values to individual pixels of an image since reliable depth determination may, and sometimes does, depend on matching pixels of an image captured by one camera to pixels of an image captured by another camera as part of the depth determination process.

In view of the above it should be appreciated that there is a need for methods and apparatus which would allow for and/or facilitate post deployment calibration of a camera system. In particular, it would be desirable if methods and/or apparatus could be developed which would facilitate frequent calibration and/or calibration updates while a camera system is in the field, e.g., while being used on a vehicle. While not necessary for all embodiments it would be desirable if in at least some embodiments, the methods and/or apparatus facilitated frequency, e.g., frame to frame, updating of camera calibration parameters and/or camera position information.

SUMMARY

Methods and apparatus for performing real time calibrations to facilitate stereoscopic depth determinations on a vehicle, e.g., a moving truck or car, are described. In some embodiments calibration is performed for each depth determination time period. In some cases, the depth determination time period is the time period from one frame capture to the next, e.g., with a depth determination being made for each frame capture time period in some but not necessarily all embodiments.

In some embodiments frame time to frame time camera calibration is supported with positional information about the cameras in the system being updated prior to making a stereoscopic depth determination with regard to one or more objects in an environment which are included in images captured by camera. By supporting such a high calibration rate e.g., where the known position of cameras in the system and/or one or more other camera system parameters are checked and updated at a high rate, stereoscopic depth determination accuracy is improved as compared to systems which are calibrated once or less frequently.

In various embodiments, an object, e.g., calibration target, or array of objects including known calibration targets, is mounted on a vehicle which includes a stereoscopic system for determining the depth, e.g., distance, to an object or objects which are external to the vehicle. Such a system is useful for determining the distance to objects in the environment, e.g., for vehicle control purposes. In one embodiment an April Tag is used as the calibration target but a wide variety of objects and/or targets of known sizes, shapes and/or known patterns can be used.

In some embodiments the stereoscopic system mounted on a vehicle is initially calibrated, e.g., in a factory, and the calibration information stored. During use images are captured by multiple cameras at the same time. In various embodiments the object or objects e.g., targets, used for calibration during use of the vehicle are mounted in the field of view of the cameras of the system. A vehicle hood ornament or other target mounting object positioned in front of multiple cameras positioned behind or in front of a vehicle windshield is used in some embodiments as the object that serves as a calibration target or array of calibration targets. In at least some embodiments one or more April Tag. QR code, or other targets of known size and shape and having a known pattern is positioned on the object being used to support calibration. QR codes often tend to be of higher resolution than April Tags and are used in some embodiments as the calibration targets. Various publicly available libraries are already available for performing camera calibration and/or position determination using April Tags making their use particularly attractive for some applications.

The calibration targets may be and sometimes are shieled from light from the front which might be due to oncoming headlights, top and sides. This can reduce the effect oncoming headlights in front of the vehicle and/or street lights above a vehicle may have on target visibility or image capture by the cameras in the stereoscopic system. An infrared or other target illuminator can be and sometimes is used to highlight the calibration targets. The use of infrared targets and an infrared illuminator can avoid interfering with driver visibility since such light is generally not visible to a human.

By using one or more arrays of targets. reliability can be enhanced as opposed to embodiments where a single calibration target is used since redundancy and different distances to multiple targets can be determined as part of the calibration process for increased calibration reliability. Different rows of targets can be and sometimes are used in rolling shutter camera embodiments where different rows of pixel sensor capture different target image portions at different times. By using multiple rows of targets portions of different targets can be captured at the same time.

One or more spatial/camera values, also sometimes referred to as calibration parameters, are determined for each camera in the system being used for depth determination based on the image captured by the particular camera being calibrated. Since the calibration targets are in the field of view of the cameras it will be included in the images captured by the cameras and available as a source of calibration information when the image is processed. The calibration information is then used to determine/update the spatial relationship information defining the location and/or spatial relationship between cameras which captured the images. The spatial relationship and/or camera information is then be used to make one or more stereoscopic depth determination.

The stereoscopic depth determinations determine the depth, e.g., distance to, objects included in the images which were captured at the same time, e.g., by different cameras. In some embodiments a depth is determined on a per pixel basis for an image, e.g., a reference image. The determined depths in at least some embodiments form a depth map providing information e.g., stereoscopically determined depths, e.g., to objects in the environment. The depths may be, and sometimes, are relative to a point or object on the vehicle, e.g., such as the front of a camera in the stereoscopic camera system.

The vehicle mounted calibration target, which is rigidly mounted to the same vehicle as the cameras of the stereoscopic system, allows for frame to frame calibrations of camera position and/or camera locations with the cameras position and/or parameters being calibrated using the same images which are used for depth determination purposes. The rapid calibration of the cameras and/or camera positions allows the system to compensate for changes due to vehicle flexing, component expansion and/or other distortions that may be due to temperature, stresses and/or other changes which occur over time in a real world environment where a vehicle is used and/or due to vehicle movement in such an environment.

By mounting fixed calibration targets having a known size, shape and/or pattern on a vehicle at fixed distances from cameras which are mounted on the same vehicle and within the field of view of the cameras, the targets can be and sometime are used to support calibration of the cameras while the vehicle is in use, e.g., in real time. Thus, captured images can be and sometimes are used to support not only detection of location and size of objects in an environment but real time calibration of the cameras being used for stereoscopic depth determination. In this way changes due to environmental conditions such as temperature or vibrations which can induce changes in the cameras due to thermal expansion, contraction or component movement can be detected and compensated for in real time through the calibration using captured images including the vehicle mounted targets. The targets being of a known size, distance and location relative to the cameras can be used and sometimes are used to facilitate estimate of the size of real world objected in captured images.

Numerous variations, benefits and additional embodiments are discussed in the detailed description which follows.

DETAILED DESCRIPTION

Figure 1:
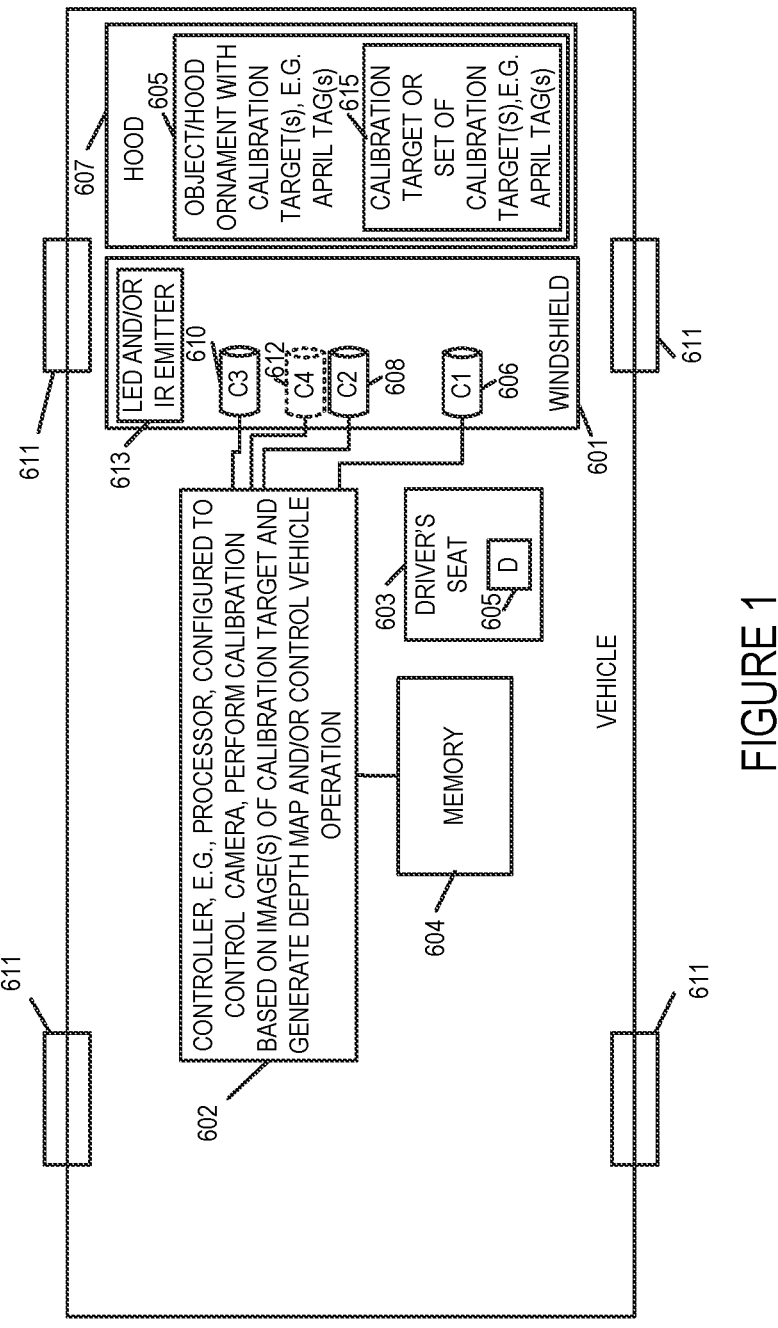
FIG. 1 is a drawing of an exemplary vehicle which supports image capture using multiple cameras, image processing in accordance with the invention to identify matching portions of images and to produce depth information and performs vehicle control vehicle operations based on the depth information obtained from the image processing.
Figure 1:

FIG. 1 is a drawing of an exemplary vehicle 600 which supports image capture using multiple cameras, image processing in accordance with the invention to identify matching portions of images and to produce depth information, and vehicle control vehicle based on the depth information obtained from the image processing. In various embodiments calibration information is generated by a controller 602 based on a calibration target 605 included in captured images as will be discussed below. Exemplary vehicle 600 includes a plurality of cameras, camera 1 (C1) 606, camera 2 (C2) 608, camera 3 (C3) 610, and camera 4 (C4) 612, which capture images through a windshield 601. Each camera 606, 606, 610, 612 includes a sensor. The vehicle includes a hood 607 and a object 605, e.g., hood ornament which includes a calibration target or set of calibration target 615, e.g. set of April Tags, in the field of view of the cameras 610, 612, 608, 606. Thus, captured images include the calibration target or set of calibration targets 615 as well as portions of the environment, e.g., in front of the vehicle, which includes objects it may be desirable for the vehicle to avoid. In one exemplary embodiment cameras C1 606, C2 608 and C3 610 are along a horizontal axis, and cameras C2 608 and C4 612 are along a vertical axis. Exemplary vehicle 600 further includes a windshield 601, a controller 602, e.g., a processor, configured to control camera operation including camera synchronization, perform calibration operations to determine camera parameters and/or camera positions, identify matching portions of images to produce depth information, generate a depth map, and/or control vehicle operation, and memory 604. The first camera C1 606 is mounted inside the vehicle and faces outward to capture images as viewed through the windshield 601; the second camera C2 608 is mounted inside the vehicle and faces outward to capture images as viewed through the windshield 601; the third camera C3 610 mounted inside the vehicle and faces outward to capture images as viewed through the windshield 601; and the fourth camera C4 612 is mounted inside the vehicle and faces outward to capture images as viewed through the windshield 601.

Controller 602 is coupled to each of the cameras (C1 606, C2 608, C3 610, C4 612). Controller 602 controls the cameras to initiate image capture, e.g., in synchronization.

Controller 602 receives images captured by each of the cameras (C1, C2, C3, C4). Controller 602 identifies matching portions of images, e.g. captured from different cameras at the same time. Controller 602 uses the image of the calibration target or set of calibration targets 615 to perform calibration operations. The controller 602 uses matching portions of images to produce depth information and generate a depth map, e.g., showing the depth (distance) to objects in the environment from a camera, other point on the vehicle or location determined relative to the vehicle. In some embodiments, controller 602 decides which of the captured images to use in generating a depth map and/or how to weight content from a captured image in generating a depth map. In some embodiments, controller 602 controls a vehicle control operation, e.g., one of a direction, braking, or speed control operation, to be performed in response to a generated depth map. In various embodiments, controller 602 uses the depth map information to perform collision avoidance operations and/or perform autopilot operations. Wheels/tires are represented by the reference number 611. The wheels 611 allow the vehicle to move in an environment while images are captured, calibration is performed and the vehicle is controlled based on the generated depth information.

Exemplary vehicle 600 includes a driver's seat 603 in which a driver 605 may be located. The components and/or configurations shown in subsequent figures can be and sometimes are used in the vehicle 600. Accordingly, while elements such as cameras or targets maybe identified with different numbers in the subsequent figures than are used to identify elements in FIG. 1, the elements are to be interpreted as par of the vehicle 600 shown in FIG. 1.

Figure 2:
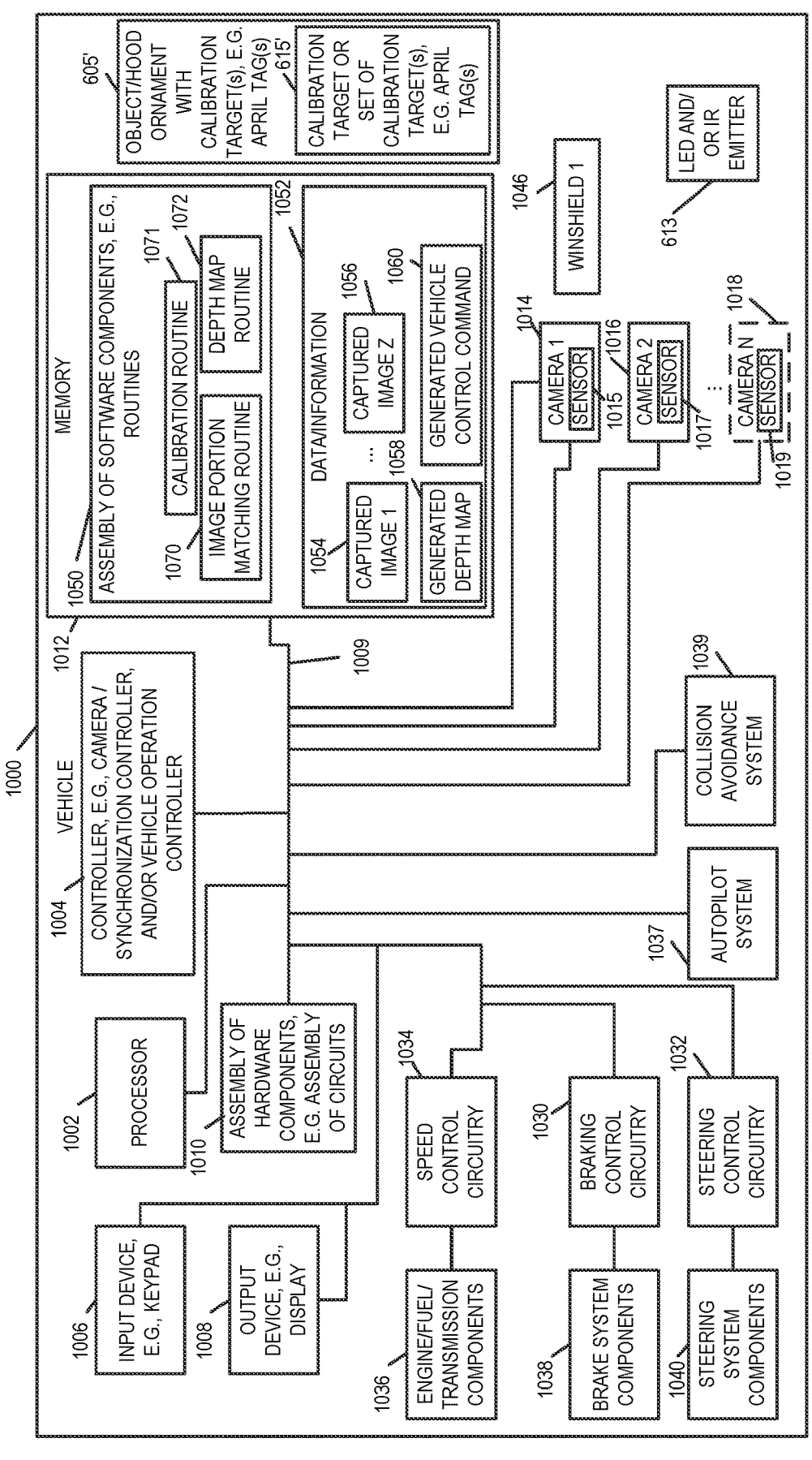
FIG. 2 is a drawing of an exemplary vehicle which supports image capture using multiple cameras, image processing in accordance with the invention to identify matching portions of images and to produce depth information and vehicle control based on the depth information obtained from the image processing.

FIG. 2 is a drawing of an exemplary vehicle 1000 which supports image capture using multiple cameras, image processing in accordance with the invention to identify matching portions of images and to produce depth information and vehicle control based on the depth information obtained from the image processing. Vehicle 1000 can be used as the vehicle 600 shown in FIG. 1 with the components shown in FIG. 2 being part of the vehicle 600 in at least one embodiment. Exemplary vehicle 1000 includes a processor 1002, e.g., a CPU, a controller 1004, e.g., a camera/synchronization controller and/or vehicle operation controller 1004, an input device 1006, e.g., a keypad, an output device 1008, e.g., a display, an assembly of hardware components 1010, e.g., an assembly of circuits, memory 1012, a plurality of cameras (camera 1 1014, camera 2 1016, . . . , camera N 1018), speed control circuitry 1034, braking control circuitry 1030, steering control circuitry 1032, an autopilot system 1037, and a collision avoidance system 1039 coupled together via a bus 1009 over which the various components may interchange data and information. Each camera (camera 1 1014, camera 2 1016, . . . , camera N 1018) includes a sensor (sensor 1 1015, sensor 2 1017, . . . , sensor N 1019), respectively. In some embodiments the sensors 1015, 1017,

1019 are what are referred to a rolling shutter sensors. However, rolling shutter sensors are not used in all embodiments. The sensor each include rows of pixel elements with each pixel element of a sensor generating a pixel value of an image based on the amount of light captured by the pixel element during an exposure time period. In some embodiments, the autopilot system 1037 and/or the collision avoidance system 1039 are coupled together and/or to the speed control circuitry 1034, braking control circuitry 1030 and/or steering control circuitry.

Vehicle 1000 further includes a windshield 1 1046, e.g., a front window, through which the cameras capture images. Vehicle 1000 further includes engine/fuel/transmission components 1036, e.g., a motor, internal combustion and/or electric, computer controlled fuel injection system, electronically controlled transmission, etc., which is coupled to speed control circuitry 1034. Vehicle 1000 further includes brake system components 1038, e.g., ABS system, brake sensors, wheel motion sensors, wheel position sensors, actuators, hydraulic components, electronically controlled brakes, etc., coupled to braking control circuitry 1030. The vehicle 1000 includes an object 605' including one or more calibration targets 615', e.g., April tag(s), which may be the same or similar to the object 605 including one or more calibration targets 615, e.g. April tag(s), and which is located in the field of view of the cameras 1014, 1016, 1018 which provide images used for calibration and depth determination purposes. Vehicle 1000 further includes steering system components 1040, e.g., rack and pinion unit, steering input controls and steering drive components including motors, etc., coupled to steering control circuitry 1032. In some embodiments, the steering control circuitry 1032, braking control circuitry 1030 and/or steering control circuitry 1032 is part of an autonomous or semi-autonomous driving control system and/or an assisted driving control system.

Memory 1012 includes an assembly of software components 1050, e.g., an assembly of software routines or software modules, and data/information 1052. Assembly of software components 1050 includes a calibration routine 1071, an image portion matching routine 1070 and a depth map routine 1072. Data/information 1052 includes one or more camera parameters 1057 generated from a captured image including a calibration target. Separate sets of parameters can be generated based on images of calibration targets and stored with one or more parameters 1057 being stored for each camera 104, 1016, 1018 in some embodiments. Data/information further includes captured images (captured image 1 1054, . . . captured image Z 1056), a generated depth map 1058, e.g., generated from captured images, and a generated vehicle control command 1060, e.g., to be sent to speed control circuitry 1034, braking control circuitry 1030, steering control circuitry 1032, autopilot system 1037 and/or collision avoidance system 1039, e.g. in response to a detected change and/or problem, detected by analyzing the generated depth map, e.g., a stopped or disabled truck suddenly is detected in front of the vehicle resulting in a control command for avoidance. The calibration routine 1071 controls the processor 1002 to perform calibration operations using the image of the calibration target or set of targets 615 or 615' included in captured images which also include objects in the environment in which the vehicle is operating and which are in the field of view of the cameras capturing the images. Thus, the captured images include both a target or set of targets which can be used for camera and/or camera position calibration as well as images of objects whose depth is to be determined for vehicle control purposes.

Figure 6:
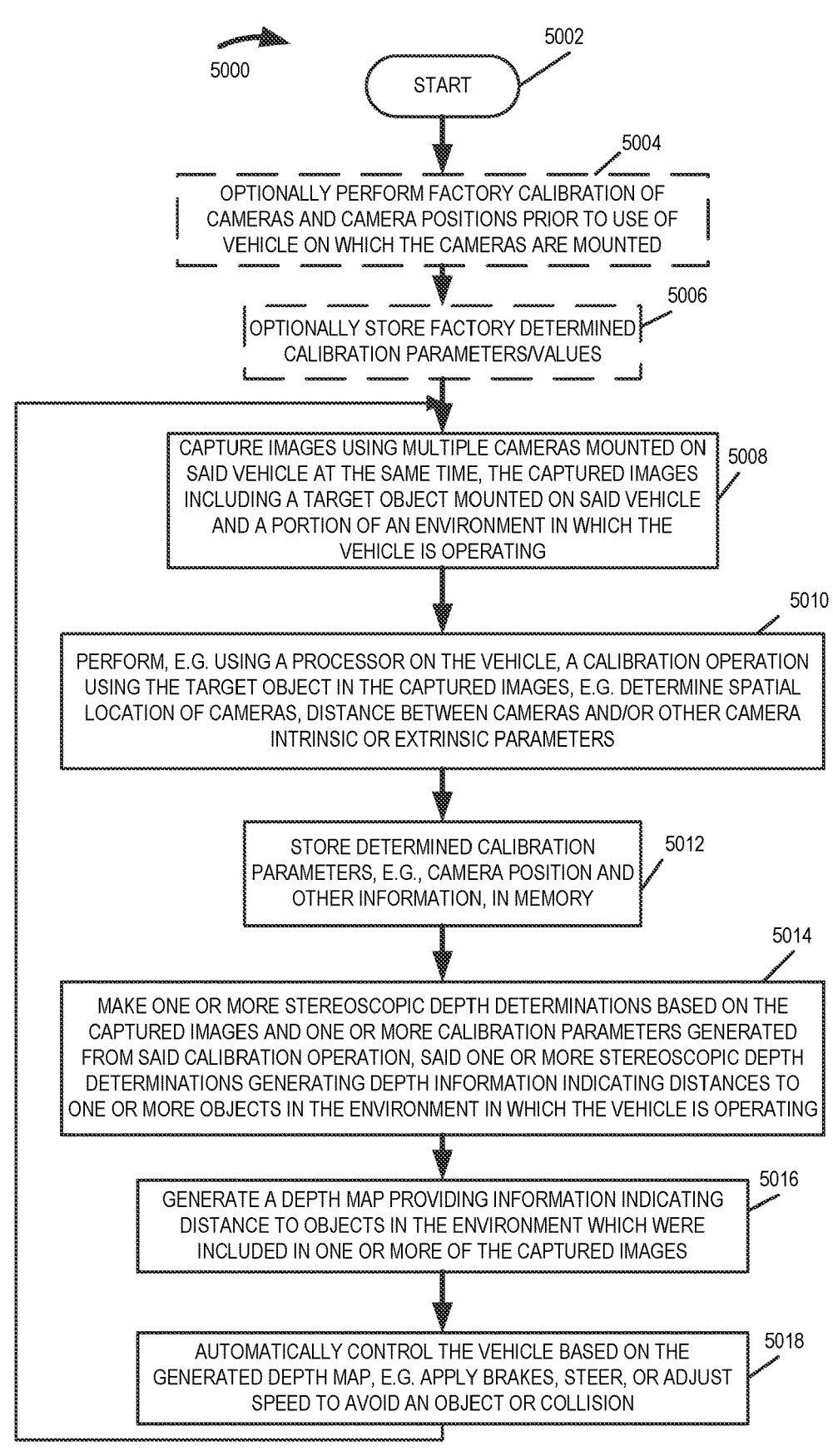
FIG. 6 is a flow chart showing an exemplary method implemented, e.g., by the processor of the vehicle of FIG. 1, in accordance with the invention in some embodiments.

Vehicle 1000 is, e.g., vehicle 600 of FIG. 1 and implements the method of flowchart 5000 of FIG. 6, and/or a vehicle implementing novel methods and/or apparatus described in this application and/or shown in any of the Figures. Vehicle 1000 is, e.g., any of: a land vehicle, e.g., a car, truck, motorcycle, bicycle, train, unmanned terrestrial vehicle, etc., a sea or water vehicle, e.g., boat, ship, unmanned water vehicle, etc., amphibious vehicle, air vehicle, e.g., airplane, helicopter, glider, unmanned aerial vehicle, etc.

Figure 3:
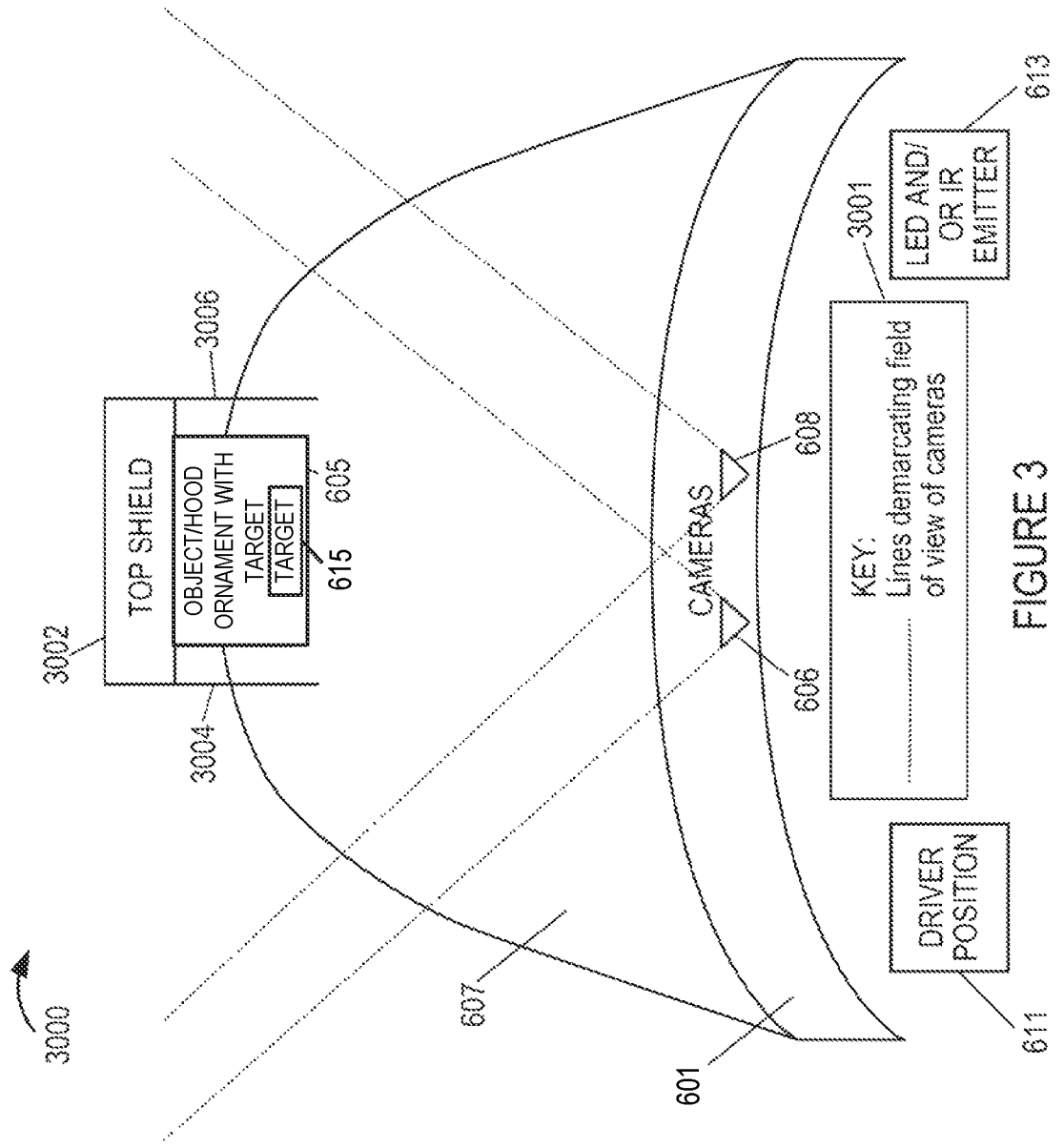
FIG. 3 is a top view showing an exemplary arrangement of a system which can be used in the vehicle shown in FIG. 1 or FIG. 2, and which includes vehicle mounted cameras and a vehicle mounted object in the form of a hood ornament that is used in some embodiments as a fixed camera calibration target or array of targets to support camera calibration, e.g., as the vehicle moves in an environment.

FIG. 3 illustrates an arrangement 3000 of a vehicle hood 607 and target object 605 with one or more calibration targets 615 which is used in some embodiments. FIG. 3 shows the positions of two cameras 606, 608 of the vehicle 600 shown in FIG. 1 positioned behind a lower portion of windshield 601. In various embodiments additional cameras are included but for purposes of illustration only 2 cameras are shown in FIG. 3. The target object 605 includes on the portion facing the cameras 606, 608 a calibration target 615 in the form of a tag or array of tags. The calibration target 615 is shielded on the top by top shield 3002, on the left side by drivers side shield 3004 and on the right side by passenger side shield 3006. The shields 3002, 3004, 3006 form a recessed area in which the calibration target or targets are located and protected from light of oncoming vehicles or from overhead street lights. The rear of the calibration target 615 or targets are opaque and blocks light from oncoming headlights entering the recessed area in which the targets are mounted facing the cameras 606, 608.

In some embodiments the driver's side shield 3004 blocks the calibration target 615 from the view of the driver to avoid annoying or distracting the driver. In some embodiments the calibration target 615 is in the form of a QR code or April Tag. In some embodiments the calibration target 615 is printed with UV visible ink which is not visible to the driver but which is visible to the cameras 606, 608. The shields 3002, 3004, 3006 block light from other car's headlights hitting the target 615 and reduce the risk of overhead lighting, e.g., street lighting, reflecting off the target and into the cameras being used to capture the images. Shields 3002, 3004, 3006 and the calibration target 615 may be part of a hood ornament 605 or air deflector 605 mounted on the hood 607 with the calibration pattern being positioned in the field of view of the cameras 606, 608. The shields 3002, 3004, 3006 may, and sometimes do, form a recessed area on the air shield or hood ornament where the calibration target is positioned.

The target object 605 including the calibration targets 615 and cameras 606, 608 are securely mounted in a rigid fashion to the vehicle to minimize, reduce or avoid changes in camera and/or target position as the vehicle travels through an environment, e.g., along a road or other path.

Figure 4:
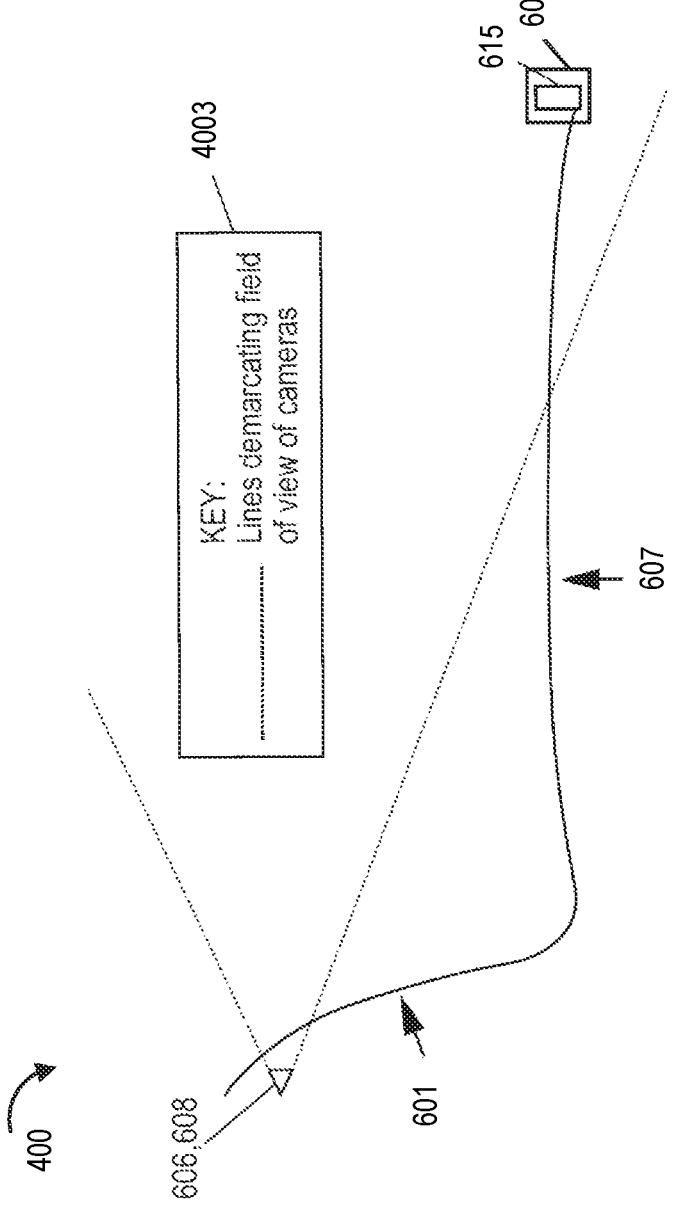
FIG. 4 is a side view of the arrangement of the cameras and object of the system shown in FIG. 3 which supports calibration through the use of the vehicle mounted object/targets

FIG. 4 is a side view 400 of the arrangement of the cameras 606, 608 and object of the system shown in FIG. 3 which supports calibration through the use of the vehicle mounted object/targets 615. Being a side view cameras 606, 608 appear as a single camera since camera 606 is behind camera 608 when viewed from the right side. The cameras 606, 608 are mounted at a fixed position behind and/or to windshield 607 with the targets 615 being mounted at the front of the hood 609. As indicated by key 4001 the dotted lines demark the camera field of view with the target 615 being within the field of view of both cameras 606, 608.

Figure 5:
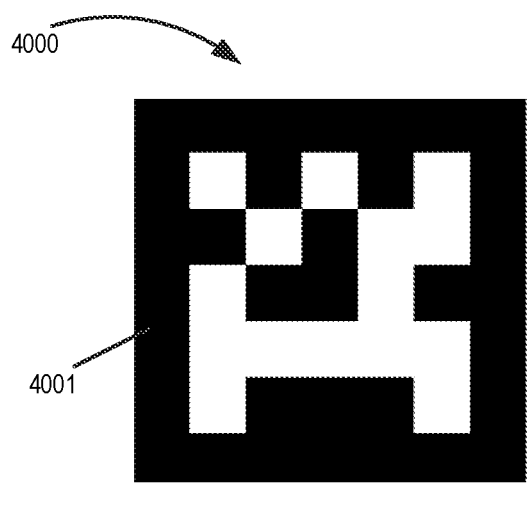
FIG. 5 shows an April Tag, also sometimes referred to as an AprilTag, apriltag, april tag, April tag or April Tags, which can be, and sometimes is, used as a calibration target on an object such as a hood ornament, in accordance with the invention.

FIG. 5 shows an exemplary AprilTag 4000 which can be, and in some embodiments is, used as the calibration target 615. The black and white squares printed on the AprilTag 400 form a pattern 4001. Different AprilTags may and sometimes do have different patterns. Thus, in cases where an array of calibration targets is used, different AprilTags can be used for different targets allowing individual targets in captured images to be easily identified. The ability to identify individual targets can be useful in considering the distance/orientation of a camera to a target when performing calibration since the targets are at fixed locations relative to the cameras capturing the images. Various publicly available routines and libraries for performing camera calibration and determining the position of the cameras which detect such a tag are available on the Internet and through other sources. Such routines can be and are used in some embodiments to determine camera and/or camera position information, e.g., parameters and/or values. QR codes are used as an alternative to AprilTags in some embodiments. Other calibration target patterns can be and sometimes are used in some embodiments.

Examples of one or more parameters which can be and sometimes are determined based on captured images, including one or more calibration targets, include one, more, or all of: camera parameters such focal length expressed sometimes as fx, fy; principal points expressed sometimes as cx, cy, lens distortion parameters expressed sometimes as k1, k2, k3, p1, p2, horizontal, vertical and diagonal field of view parameters, stereo calibration parameters such as rotation and translation between left and right eye camera views.

In various embodiments calibration of a camera system mounted on a vehicle 600 or 1000 is facilitated by mounting one or more objects 605, e.g., calibration targets 615, of known shape and size in the field of view of cameras in the stereoscopic camera system. The target, e.g., a hood ornament may be and sometimes is positioned at a location which is shielded from view from a driver of the vehicle on which the calibration target is mounted.

In some embodiments the object includes one or more LEDs or IR emitters 613. In other embodiments the object is an IR illuminated target. The use of an IR target reduces the target's visibility to a driver of the vehicle since IR light is outside the range of human perception. In some embodiments an object such as a hood ornament 605 is used as the object having a fixed location and distance from the cameras 610, 612, 608, 606 of the stereoscopic camera system.

In some embodiments the target is a QR code (or a similar type visual object, e.g., AprilTags) which includes a pattern with all or portions of the pattern repeating in both the vertical and horizonal dimensions visible to the cameras of the stereoscopic depth determination system. AprilTags is a visual fiducial system, useful for a wide variety of tasks including augmented reality, robotics, and camera calibration. The tags provide a means of identification and 3D positioning, even in low visibility conditions. The tags act like barcodes, storing a small amount of information (tag ID), while also enabling simple and accurate 6D (x, y, z, roll, pitch, yaw) pose estimation of the tag. Such a tag is particularly useful for camera calibration and can be used using known calibration techniques to determine a camera's position relative to the tag. The information obtained about an individual camera's position relative to the target object, e.g., an AprilTags image on an object such as a hood ornament can be, and sometimes is, then used to calibrate the relative position of cameras in the system to one another. Once or more of the generated calibration parameters, e.g., camera position parameters are then used to estimate the depth to one or more object in captured images using stereoscopic depth determination techniques and the known positional relationships of the cameras calibrated using the target object 605 and/or calibration target 615. Examples of one or more parameters which can be and sometimes are determined based on captured images include one, more, or all of: camera parameters such focal length expressed sometimes as fx, fy; principal points expressed sometimes as cx, cy, lens distortion parameters expressed sometimes as k1, k2, k3, p1, p2, horizontal, vertical and diagonal field of view parameters, stereo calibration parameters such as rotation and translation between left and right eye camera views.

In various embodiments real time camera system camera calibration is performed and/or updates to calibration information are made based on the location at which the calibration object 605 is detected in captured images. By using a fixed object, e.g., calibration target 615 or array of targets, to facilitate real time calibration updates, minor changes between the positions of cameras mounted on a vehicle can be, and sometimes are, detected from the captured images and calibration information can be updated from frame to frame even while the vehicle 600 or 1000 is in motion. Thus, even small changes in camera positions relative to each other can be detected and taken into consideration as depth determinations are made on an ongoing basis over a period of time.

Parameters which can be, and sometimes are, calculated based on the use of the fixed target(s) such as the targets 615 include one, more, or all of: camera parameters such focal length expressed sometimes as fx, fy; principal points expressed sometimes as cx, cy, lens distortion parameters expressed sometimes as k1, k2, k3, p1, p2, horizontal, vertical and diagonal field of view parameters, stereo calibration parameters such as rotation and translation between left and right eye camera views.

Depending on the embodiment the set of cameras can be mounted in a variety of locations on a vehicle with a set of forward facing cameras sometimes being mounted in front or behind the vehicle windshield. In some embodiments wide focal length cameras are used allowing the calibration object to appear in the images of each camera in the set of cameras being used. To facilitate calibration, in some embodiments the object 605 with one or more calibration targets 615 is positioned to maximize its distance from the set of cameras while being mounted to a portion of the vehicle 600 which will remain rigid and at a fixed distance from the cameras being used for depth determination even as the vehicle 600 moves, e.g., along a road or up/down a hill.

Numerous variations on the above described methods and apparatus are possible.

In some embodiments camera calibration includes determining parameters for (a) camera extrinsics, which tell us how the cameras are placed and oriented in the 3D world and (b) camera intrinsics, which govern how a known 3D location gets mapped to a particular pixel of the camera. For any given camera, the extrinsics are fully specified by two entities: rotation and translation with respect to the world. One needs 3 numbers, e.g., values, to specify the rotation (loosely speaking, how is camera pitched, rolled and yawed in the world) and 3 numbers to specify the translation (e.g., the latitude, longitude and altitude of the camera). The extrinsics are specified in some cases in terms of focal length expressed in units of pixels (i.e., one unit is the length of one pixel of the sensor) and the principal point, which is the location where the optical axis of a lens intersects the sensor specified in terms of pixel coordinates. These values, sometimes referred to as parameters, can be and sometimes are determined by the calibration process of the present invention.

For the case of stereo normal cameras, which are used in some embodiments, in which all cameras face in the same direction looking towards the horizon and such that their camera centers are on the same horizonal line, all parameters can be, and sometimes are, estimated except there is an unknown offset in the horizontal (x) pixel coordinate of the principal point. The offsets of the cameras are related to each other by the length of the baseline from a reference camera—the baseline being the line joining the camera center of a camera to that reference camera center. In essence, there is one unknown value which when determined fully specifies camera calibration. This value can be and is determined in some embodiments based on the captured images of the calibration target or targets 615.

It can be shown for more complicated arrangements that there is an unknown value (not necessarily an offset in the principal point location) that ties together the ambiguities across the system. This value when determined fully specifies camera calibration. This value, which is sometimes called a parameter, is determined as part of the calibration process in some embodiments using the captured images in which the target object 605 and/or targets 615 are visible.

FIG. 6 illustrates the steps of a method 5000 of capturing images and controlling image calibration in accordance with the invention. The method 5000 is implemented in some embodiments by the processor 602 or the processor 1002 or the controller 1004 which operates as a camera system calibration and vehicle control device.

The method 5000 allows calibration to be performed on each set of captured images allowing real time system calibration to be performed, e.g., at a rate equal to the depth map generation rate and/or with calibration being performed for each set of captured stereoscopic images.

The method 5000 begins in step 5002, e.g., with the vehicle 600, 1000 being powered on. Steps 5004 and 5006 are optional factory calibration steps which may be, and sometimes are, performed prior to initial use of the vehicle in the environment. These steps 5004, 5006 are normally skipped and not performed during routine vehicle use.

In optional step 5004 an initial factory calibration of the camera systems is performed. This may be done by the processor 602, e.g., when the vehicle is at a factory, e.g., in a calibration room or with large calibration charts in the camera's field of view. In step 5004 initial camera position and other calibration parameters are generated and then stored in step 5006 which is also optional. These parameters can be, and sometimes are, updated or replaced by calibration information, parameters or values generated while the vehicle is in use, e.g., in step 5010. Operation proceeds from step 5006 to step 5008.

Operation proceeds directly from start step 5002 to step 5008 in embodiments where optional steps 5004 and 5006 are not performed.

In step 5008 the cameras mounted on the vehicle, e.g., under control of processor 602 or processor 1002, and/or controller 1004, are controlled to capture images at the same time. The captured images include a portion of an environment, e.g., road area, where the vehicle is operating as well as the target object and thus the calibration target or targets 615 which are part of the target object 605.

Operation proceeds from image capture step 5008 to calibration step 5010. In step 5010 the processor 602 or 1002 performs a calibration operation using the target object or targets 615 in the captured images to determine spatial location of the cameras, distance between the cameras and/or other intrinsic or extrinsic camera system parameters. Some of the parameters which are generated include the values discussed above which can be used to remove possible ambiguity and thus facilitate stereoscopic depth determinations. The parameters are generated on a per camera basis in some embodiments.

The parameters/values and/or other information are then stored, e.g., in memory 604, 1052, in step 5012 so that they are available for future use, e.g., in stereoscopic depth determinations. With camera calibration having been performed based on the captured images operation and the calibration parameters stored, operation proceeds to step 5014.

In step 5014 one or more stereoscopic depth determination are made based on the captured images and one or more of the calibration parameters or values generated in step 5010. In this way depth information regarding the operating environment is generated from the same images which were used for calibration. As part of the depth determination process performed in step 5014 the depth, e.g., distance, from a reference location corresponding to a portion of the vehicle, to one or more objects (e.g., objects 957, 959 of FIG. 9) in the environment is determined. This distance information is useful and is used in performing vehicle control operations.

Operation proceeds from step 5014 to step 5016 in which a depth map providing information indicating distance to an object or objects 957, 959 in the environment is generated from the depth determinations made in step 5014. The depth map includes depth information, on a per pixel basis, and indicates the distances to objects included in one or more of the captured images such as an image captured by a reference camera, e.g., camera 906, in the set of cameras, e.g., cameras 906, 908 of FIG. 9, mounted on the vehicle.

Operation proceeds from step 5016 to step 5018 in which the processor 602 or 1002 or controller 1004 automatically controls the vehicle 600 or 1000 based on the generated depth information, e.g., the information included in the generated depth map.

Operation is shown proceeding from step 5018 to step 5008 to show that the image capture, calibration and depth determination steps can be performed on an ongoing basis. Calibration can and sometimes is performed for each set of captured images thereby improving the accuracy of the depth determinations since the calibration will detect minor changes in camera positions and/or camera characters that occur during use due to thermal changes, stress due to vehicle motion and/or for other reasons. Since calibration is performed for each captured set of images where the images are captured in parallel by the different cameras, the calibration rate matches the individual camera frame capture rate. In addition, the calibration rate matches the depth map generation rate since one depth map is generated for each set of captured images.

The methods can be implemented using one or more fiducial marker, e.g., a hood mounted Aprils Tag, have been discussed. Use of a single target, e.g., marker, can be and sometimes is used to remove a one-parameter ambiguity in estimating camera geometry, e.g., where a camera in a set is relative to the marker and/or other cameras at known or determined locations relative to the marker. Using multiple fiducial markers, e.g., multiple targets, which are located at fixed positions with respect to each other gives still greater flexibility and supports the ability to track variation in the extrinsic parameters of one or more cameras with respect to a reference camera.

Looking at the image of the fiducial markers in the camera allows one to estimate the roll, pitch, yaw of the camera relative to the hood. The same could be done for all cameras and thus the system can and sometimes does estimate the relative roll, pitch and yaw between the cameras in the system.

Figure 7:
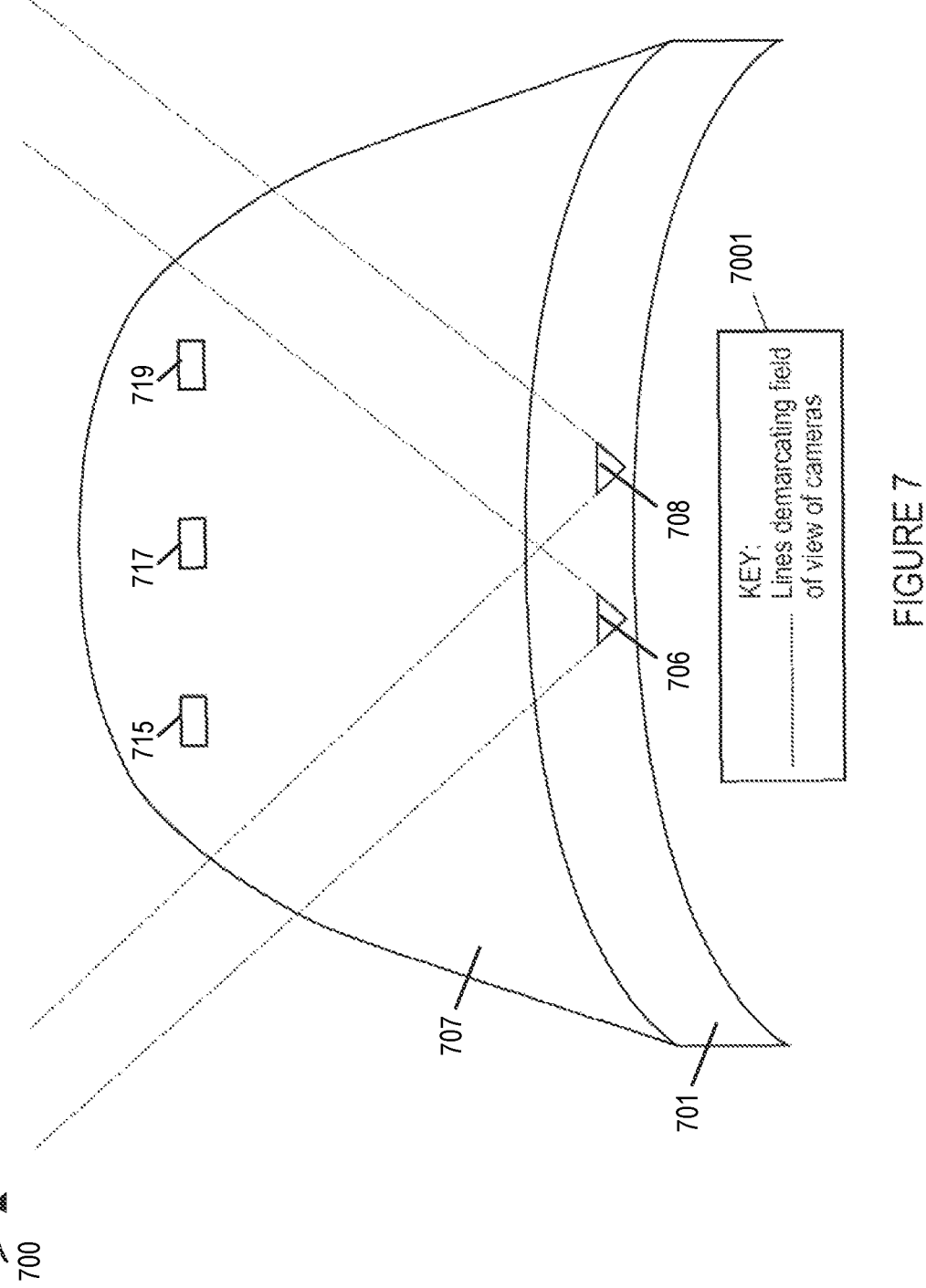
FIG. 7 illustrates an example of an embodiment which can be used by the vehicle of FIG. 1 or any of the other figures in which a horizontal row of fiducial markers is mounted on a vehicle hood within view of a set of cameras which are positioned in a horizontal plane which extends parallel to the row of fiducial markers.

FIG. 7 includes drawing 700 which shows an embodiment where multiple, e.g., 3 fiducial markers 715, 717, 719 are positioned in a horizontal row along the front of a vehicle, e.g., on or above the hood 707, in the field of view of a set of cameras including a left camera 706 and right camera 708. Key 7001 indicates that dotted lines are used to demarcate the field of views of the cameras 706, 708. In various embodiments the left and right cameras 706, 708 are implemented using a rolling shutter arrangement, e.g., where the sensor will read out rows of pixels that were captured in a sequence with different rows of pixels corresponding to different capture times. In the example the cameras 706, 708 and the images sensors included therein are mounted in a horizontal plane that is parallel to the horizontal plane in which the fiducial markers 715, 717, 719 are mounted. The fiducial markers, e.g., targets, and camera sensors extend up out of the horizontal planes in which they are mounted. The sensors of the two cameras 706, 708 are synchronized. In this way, rows of pixels capturing pixel values corresponding to the fiducial markers 715, 717, 719 will be captured by the sensors of the two cameras 706, 708 at the same or nearly the same time. The capture of the multiple sensors can be used to facilitate camera position, e.g., location, determination.

Figure 8:
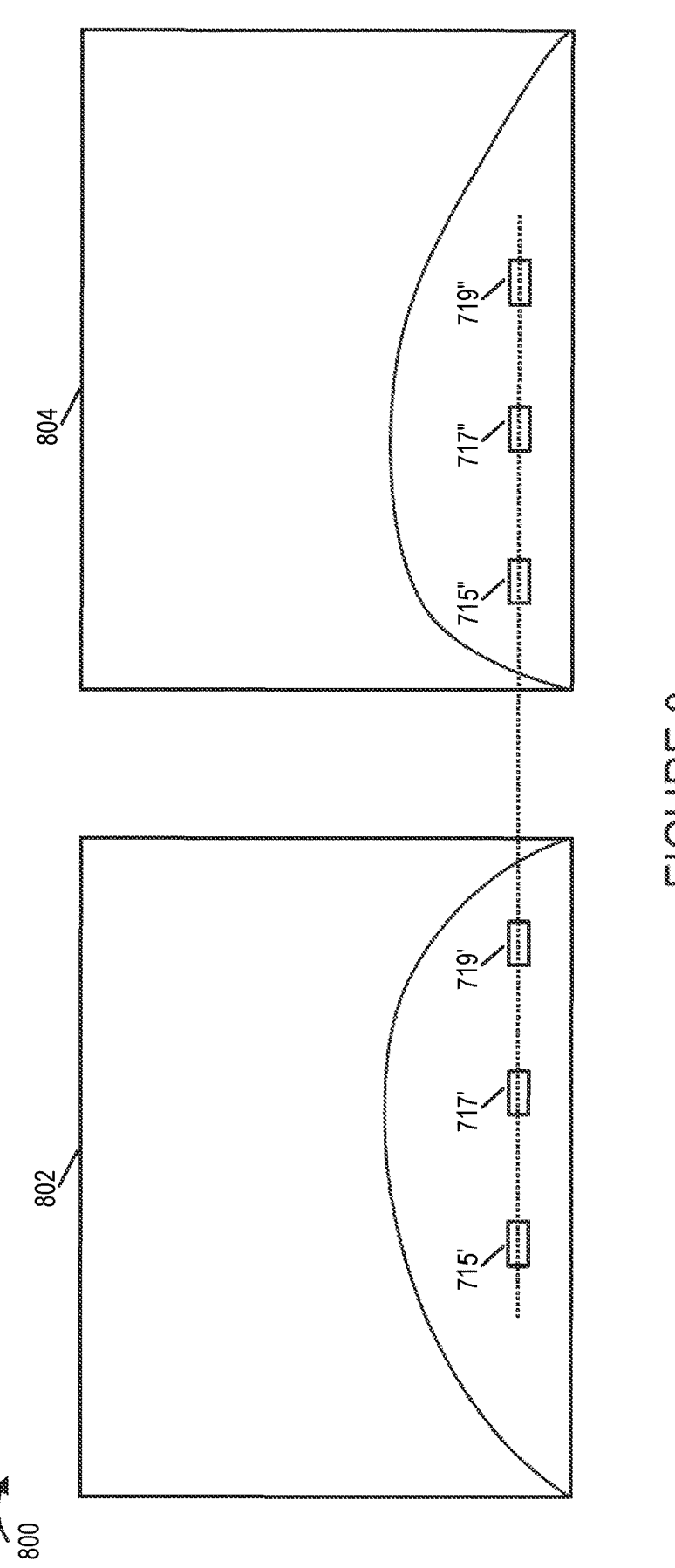
FIG. 8 illustrates images captured by the left and right cameras of FIG. 7 in one embodiment.

FIG. 8 set 800 of left 802 and right 804 captured images including images 715', 717', 719' and 715", 717", and 719" of corresponding calibration targets 715, 717, 719 shown in FIG. 7.

Figure 9:
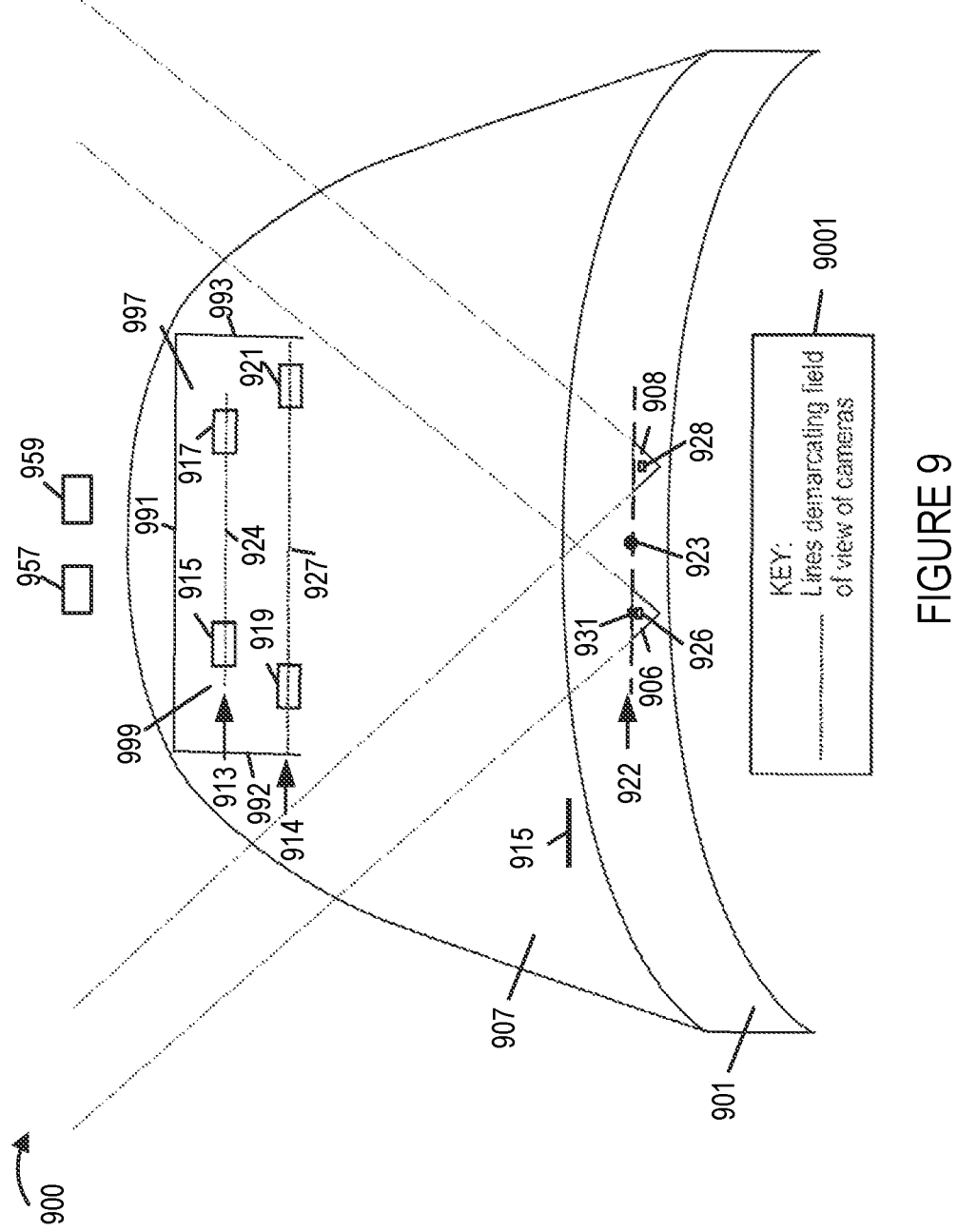
FIG. 9 illustrates an exemplary hood/marker/camera arrangement which can be and sometimes is used by the vehicle of FIG. 1 or any of the other figures, which is similar to the one shown in FIG. 7 but with two different rows of markers in different horizontal planes.

FIG. 9 shows an arrangement 900 in which left and right cameras 906, 908 including sensors 926, 928, respectively, with rolling shutters are used. In the FIG. 9 example multiple rows of calibration targets 915, 917, 919, 921, e.g., fiducial markers, are used. They are mounted on hood 907 and shieled from light by a left shield 922, a right shield 933 and a top light shield 991 which form a recessed area 999. The back of the recessed area 997 which faces the cameras and upon which the targets 915, 915, 919, 921 may be mounted block light from headlights of on coming vehicles passing through the targets. The first row 913 of fiducial markers extends along a first line 924 and a second row of fiducial markers 919, 921 extend along a second line 927. A shield 915 may and in some embodiments is mounted to block a driver's view of the targets. In the FIG. 9 example cameras 906, 908 with rolling shutter sensors 926, 928 are used to capture images of the targets 915, 917, 919, 921. Key 9001 shows that dotted lines are used to demark the field of view of the cameras 906, 908. In the FIG. 9 example in some embodiments the left camera 906 is used as a reference camera with the point 931 on the front of the reference camera marking a point from which distance to objects is indicated in some embodiments. The cameras 906, 908 are arranged along line 922 and are positioned behind or attached to windshield area 901. External objects 957, 959 are in the field of view of cameras 906, 908. As part of the process of implementing the method shown in FIG. 6, after determining or more calibration parameters based on images captured by cameras 906, 908 the depth, e.g., distance to each of the objects 957, 959 will be determined.

The assembly 900 shown in FIG. 9 maybe and in some embodiments is part of the vehicle shown in FIGS. 1 and 2 and sometimes includes the target illuminator 613 shown in FIG. 1. The assembly 900 can and sometimes does include additional cameras beyond cameras 906 and 908 such as the additional cameras 610, 612 shown in FIG. 1 but for purposes of explanation they are omitted from the FIG. 9 example.

FIG. 9 is an example hood/camera arrangement 900 with multiple rows 913, 914 of fiducial markers, e.g., April Tags, mounted on the hood 907 of a vehicle. The first 913 and second 914 marker rows will be captured by different pixel sensor rows due to their different positions. The captured left 10002 and right images 10004 shown in FIG. 10 which have the first closer spaced markers 915, 917 appear in the upper portion of the captured frames and the second row 914 of more widely spaced markers 919, 921 appear in the lower portion of the image frames 10002, 10004. In some embodiments the first row of fiducial markers is in a horizontal plane, e.g., above the second row of markers or in a position which will be captured in time first by upper rows of pixel sensors of the cameras before the second row of markers is captured. Thus, the two different rows 913, 914 of markers will be captured at different times with the left 906 and right 908 cameras capturing each row 913, 914 of markers at the same or almost the same time due to camera synchronization. Images of both rows are captured in a single frame time with each row of markers occupying less than half the rows of pixels in a frame, e.g., 10 to 50 rows of pixels in some cases but in most cases less than ¼ of the rows of a captured image, e.g., camera frame.

Figure 10:
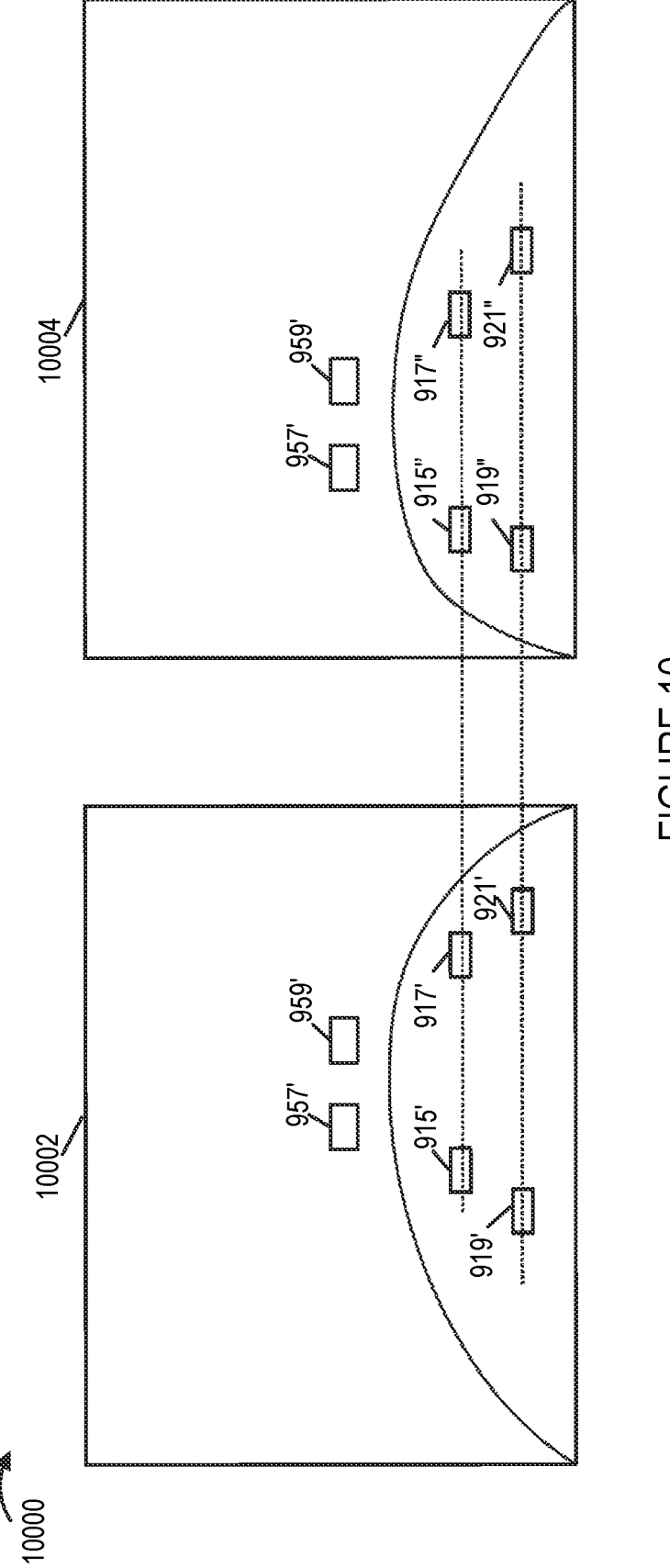
FIG. 10 illustrates images captured by the marker and camera arrangement of FIG. 9.

FIG. 10 shows a set 10000 of left 10002 and right 10004 images captured by the cameras 906, 908 shown in FIG. 9 in accordance with some embodiments. Note that in left image 10002 images 915', 917' of targets 915, 917 appear in a first horizontal row in image 10002 with images 919' and 921' of targets 919, 921 appearing in a second horizontal row lower down in the image 10002. Similarly in right camera image 10004 images 915", 917" of targets 915, 917 appear in the first horizontal row with images 919" and 921" of targets 919, 921 appearing in the second horizontal row lower down in the image 10002.

The images 915', 917', 919', 921' in the left camera image 10002 and the corresponding target images 915", 917", 919", 921" in the right camera image 10004 of the targets 915, 917, 919, 921 each correspond to multiple rows of pixel values but occupy only a portion of the total number of rows of pixels in the image.

Different rows of pixels of an image in the case of rolling shutter sensors correspond to different exposure time periods since rolling shutter sensors 926, 928 capture pixel values at different times. Some motion of cameras, e.g., changes in camera position, can occur between the capture of rows of pixel values corresponding to different portions of an image in the case where rolling shutters are used.

For cameras 906, 908 with rolling shutter sensors 926, 928 where individual lines in a frame are imaged at different time instances, it can be important that the fiducial markers that are used to estimate camera extrinsics for a given time instance are captured as close in time as possible since camera position may change with time. Accordingly, it can be desirable that the fiducial markers be captured in a number of consecutive rows of the sensor with the number of consecutive rows occupying a portion, e.g., a fraction of the image frame to avoid the fiducial capture taking the full or close to the full frame time. In some embodiments the fiducial markers 915, 917, 919, 921 are captured using between 5 and 25 rows of pixels per fiducial marker target but other numbers or rows are also possible.

In the FIG. 10 example two rows of hood mounted fiducial markers are captured by two cameras, a left camera and a right camera facing forward towards the markers. The left camera captures the left image while the right camera captures the right image. In embodiments where the left and right cameras use rolling shutters, the top row of markers is captured by the cameras at a first time and the lower, second row of markers is captured at a second time, e.g., a later time if operation rolling shutter capture and read out proceeds from top to bottom. Based on the two rows of markers, the changes in camera extrinsics between the time at which the first row of markers is captured and the time the second row is captured can and sometimes are determined.

If multiple cameras are being used for image capture such as in the examples shown in FIGS. 7-10, these cameras should image the fiducial markers as close in time to each other as possible since the cameras may move over time due to vehicle flexing, vibration etc. This is the reason for the synchronized image capture and also why in some cases the fiducial markers are located in a horizontal plane parallel to the image capture plane. Furthermore. it is desirable that it not take the full frame time to capture an individual row fiducial markers. By using only a portion of a frame time, e.g., a set of rows less than ¼ the number of image rows, the pixels are captured closer in time than in the marker occupied the entire frame and took a full frame time to capture. Thus, while using large markers occupying almost the full vertical height of an image might seem desirable form the perspective of having a large marker for physical distance measurement purposes, use of multiple smaller markers arranged in rows, each corresponding to only ¼ or less of the rows of an image frame can be desirable for temporal reasons in the case of rolling shutter implementations. Accordingly, in some embodiments multiple rows of fiducial markers each occupying ¼ or less of an image in terms of vertical height, are used in some embodiments. FIG. 9 shows two rows of targets, e.g., fiducial markers, but in some embodiments 4 or more rows of targets are used and positioned to appear in a different vertical portion of images used for calibration purposes.

To be useful in determining camera position related values, the fiducial markers used to determine one set of extrinsic parameters should be imaged as close as possible in time and in as short a time period as reasonably possible. This reduces the risk of camera motion during the fiducial marker capture interval by reducing or minimizing the capture time period.

This in effect suggests that the fiducial markers used for one set of extrinsic parameters should be imaged as close in terms of sensor pixel row numbers for one camera as reasonably possible to minimize the time between the start and top of the capture of the marker image. If multiple cameras are involved, these cameras should image the fiducial markers as close in time to each other as possible. For multiple cameras, the cameras should be, and sometimes are, synchronized such that the corresponding rows which capture the fiducial markers, are captured close in time. Horizontal alignment of cameras and markers in combination with using less than the full camera sensor area, in terms of using less rows than are included in the sensor, to capture one or a set of markers facilitates these objectives.

With cameras such as cameras 906, 906 which use sensors 926, 928 with rolling shutters, having multiple rows 913, 914 of targets, e.g., fiducial markers, as shown in FIG. 9 can be beneficial. In the FIG. 9 example each of the markers 915, 917, 919, 921 is captured in a subset of the rows of pixels of a frame, e.g., captured image. This allows multiple rows 913, 914 of fiducial markers to be captured in a single frame time, e.g., single image. This is used in some embodiments to track how cameras move, e.g., vibrate with respect to each other, within a single frame time with the images (pixel values) of the different horizontal fiducial markers corresponding to different times even though they both correspond to the time in which the overall image (e.g., frame) was captured.

Numerous embodiments are possible and contemplated. Set forth below are some exemplary numbered lists of exemplary embodiments but they are not intended to be limiting and other embodiments and combinations of features are possible and within the scope of the invention.

NUMBERED LIST OF EXEMPLARY METHOD EMBODIMENTS

Method Embodiment 1. A vehicle control method comprising: operating a plurality of cameras (906, 908) mounted on a vehicle (600) to capture images (10002, 10004) at the same time, said captured images (10002, 10004) including images (915', 917', 919', 921', 915", 917", 919", 921") of one or more targets (915, 917, 919, 921) mounted on said vehicle (600), said one or more targets being positioned in the field of view of said cameras (906, 908); performing a calibration operation based on the captured images to generate one or more calibration parameters; and making one or more stereoscopic depth determinations based on the captured images and one or more calibration parameters generated from said calibration operation, said one or more stereoscopic depth determinations generating depth information indicating distance information to one or more objects (957, 959).

Method Embodiment 2. The method of Method Embodiment 1, further comprising: automatically controlling vehicle operation (e.g., braking, turning and/or acceleration) based on determined depths.

Method Embodiment 3. The method of Method Embodiment 1, wherein said one or more targets (915, 917, 919, 921) include a first row of targets (913) including at least two targets (915, 917).

Method Embodiment 4. The method of Method Embodiment 3, wherein said at least two targets (915, 917) are positioned on a first horizontal line (924) extending parallel relative to a line (922) along which two cameras (906, 908) in said plurality of cameras (906, 908) are mounted in said vehicle (600).

Method Embodiment 5. The method of Method Embodiment 3, wherein said one or more targets (915, 917, 919, 921) further include a second row of targets (914) including at least two targets (919, 921).

Method Embodiment 6. The method of Method Embodiment 1, wherein said two cameras (906, 908) use rolling shutter based sensors (926, 928) to capture images of said one or more targets (915, 917, 919, 921).

Method Embodiment 7. The method of Method Embodiment 5, wherein said first and second rows of targets (913, 914) are mounted on said vehicle (600) at different locations (e.g. at different heights relative to the bottom of the vehicle or at different distances from the front of the cameras) and correspond to the field of view of different portions (e.g., different horizontal rows of pixel elements) of said first and second sensors (926, 928).

Method Embodiment 8. The method of Method Embodiment 7, wherein at least a portion of said first row (913) of targets (915, 917) are captured at different times by different portions of the sensors (926, 928) of said two cameras (906, 908) than at least a portion of said second row (914) of targets (919, 921).

Method Embodiment 9. The method of Method Embodiment 1, further comprising: generating a depth map providing distance information to objects in one or more of said captured images, said depth map indicating a distance for each pixel of an image including at least one of said one or more objects.

Method Embodiment 10. The method of Method Embodiment 9, further comprising: automatically controlling vehicle operation (e.g., braking, turning and/or acceleration) based on the generated depth map.

Method Embodiment 11. The method of Method Embodiment 9, wherein each distance is a distance from i) a fixed point (923, e.g., the front center of the camera array) determined with reference to said vehicle (600) on which the camera system is mounted, ii) a fixed location (932) corresponding to a camera in said system (e.g., from the front center of a camera used as a reference camera) or iii) to an object visible to the cameras in said system.

Method Embodiment 12. The method of Method Embodiment 1, wherein each target (915, 917, 919, 921) in the one or more targets includes a known pattern (e.g., AprilTag 4000) of a known size and shape.

Method Embodiment 13. The method of Method Embodiment 12, wherein the known pattern of one or more different targets (915, 917, 919, 921) are different (e.g., each target has a different AprilTag) allowing identification of the individual different targets (915, 917, 919, 921) in the captured images.

Method Embodiment 14. The method of Method Embodiment 12, wherein said one or more targets (915, 917, 919, 921) are mounted to a first rigid part (e.g., hood (907)) of said vehicle (600) and wherein said plurality of cameras is mounted at a second rigid part (e.g., dashboard or portion of a windshield (901)) of said vehicle (600).

Method Embodiment 15. The method of Method Embodiment 1, wherein said first and second rigid parts (907, 901) of said vehicle (600) remain in fixed positions with respect to a reference point of the vehicle and relative to each other, during vehicle use.

Method Embodiment 16. The method of Method Embodiment 14, wherein said one or more targets (915, 917, 919, 921) are at fixed distances from said plurality of cameras (906, 908) (e.g., each target (915, 917, 919, 921) being a fixed distance from reference point (923) corresponding to the set of cameras (906, 908).

Method Embodiment 17. The method of Method Embodiment 1, wherein each target (915, 917, 919, 921) includes a pattern (e.g., AprilTag pattern 4001).

Method Embodiment 18. The method of Method Embodiment 17, further comprising: operating an IR emitter (613) to illuminate the targets (915, 917, 919, 921).

Method Embodiment 19. The method of Method Embodiment 17, wherein said pattern (4001) is not visible to a driver (605) sitting in a driver's seat (603) of the vehicle (600).

Method Embodiment 20. The method of Method Embodiment 19, wherein said pattern (4001) includes an infrared pattern which can be detected by cameras (906, 908) in said plurality of cameras but is not visible to a human eye.

Method Embodiment 21. The method of Method Embodiment 19, wherein said pattern (4001) is a QR code or April Tag.

Method Embodiment 22. The method of Method Embodiment 21, wherein said pattern (4001) is covered by a horizontally extending light shield (991).

Method Embodiment 23. The method of Method Embodiment 22, wherein said pattern (4001) is blocked from a driver's view by a shield (992, 993,991 or 915) blocking view of the pattern by the driver (605) of the vehicle (600).

Method Embodiment 24. The method of Method Embodiment 22, wherein the pattern (4001) is shielded from light from the driver's side of the vehicle (600) by a first side shield (992) and shielded from light from the passenger side of the vehicle (600) by a second side shield (992) and shielded from light from above by a top shield (991).

Method Embodiment 25. The method of Method Embodiment 24, wherein said targets (915, 917, 919, 921) are non-transparent or mounted on a non-transparent surface (997) blocking light from oncoming vehicles passing through said targets (915, 917, 919, 921).

Method Embodiment 26. The method of Method Embodiment 24, wherein said top (991), first (992) and second (993) side shields form one or more recessed areas (999) in which said one or more calibration targets (915, 917, 919, 921) are located (note that the surface 997 is used to indicate the surface for the recessed area (999) on which the targets are mounted and which is a solid surface obstructing light from vehicles on a road or facing towards the windshield (901) and cameras (906, 908) mounted of the vehicle 600), said one or more recessed areas being visible to said plurality of cameras (906, 908).

NUMBERED LIST OF EXEMPLARY SYSTEM EMBODIMENTS

System Embodiment 27. A system comprising: a vehicle (600); a plurality of cameras (906, 908) mounted on said vehicle (600); one or more targets (915, 917, 919, 921) mounted on said vehicle (600), said one or more targets being positioned in the field of view of said cameras (906, 908); a processor (602, 1002 or 1004) configured to: i) control the cameras (906, 908) to capture images (10002, 10004) at the same time, said captured images (10002, 10004) including images (915', 917', 919', 921', 915", 917", 919", 921") of one or more targets (915, 917, 919, 921); ii) perform a calibration operation based on the captured images to generate one or more calibration parameters; and iii) make one or more stereoscopic depth determinations based on the captured images and one or more calibration parameters generated from said calibration operation, said one or more stereoscopic depth determinations generating depth information indicating distance information to one or more objects (957, 959).

System Embodiment 28. The system of System Embodiment 27, wherein said processor (602, 1002 or 1004) is further configured to automatically control vehicle operation (e.g., braking, turning and/or acceleration) based on determined depths.

System Embodiment 29. The system of System Embodiment 27, wherein said one or more targets (915, 917, 919, 921) include a first row of targets (913) including at least two targets (915, 917).

System Embodiment 30. The system of System Embodiment 29, wherein said at least two targets (915, 917) are positioned on a first horizontal line (924) extending parallel relative to a line (922) along which two cameras (906, 908) in said plurality of cameras (906, 908) are mounted in said vehicle (600).

System Embodiment 31. The system of System Embodiment 29, wherein said one or more targets (915, 917, 919, 921) further include a second row of targets (914) including at least two targets (919, 921).

System Embodiment 32. The system of System Embodiment 27, wherein said two cameras (906, 908) include rolling shutter based sensors (926, 928) for capturing images of said one or more targets (915, 917, 919, 921).

System Embodiment 33. The system of System Embodiment 31, wherein said first and second rows of targets (913, 914) are mounted on said vehicle (600) at different locations (e.g. at different heights relative to the bottom of the vehicle or at different distances from the front of the cameras) and correspond to the field of view of different portions (e.g., different horizontal rows of pixel elements) of said first and second sensors (926, 928).

System Embodiment 34. The system of System Embodiment 32, wherein at least a portion of said first row (913) of targets (915, 917) are captured at different times by different portions of the sensors (926, 928) of said two cameras (906, 908) than at least a portion of said second row (914) of targets (919, 921).

System Embodiment 35. The system of System Embodiment 27, wherein the processor (602, 1002 or 1004) is further configured to: generate a depth map providing distance information to objects in one or more of said captured images, said depth map indicating a distance for each pixel of an image including at least one of said one or more objects.

System Embodiment 36. The system of System Embodiment 35, wherein said processor is further configured to automatically control vehicle operation (e.g., braking, turning and/or acceleration) based on the generated depth map.

System Embodiment 37. The system of System Embodiment 35, wherein each distance is a distance from i) a fixed point (923, e.g., the front center of the camera array) determined with reference to said vehicle (600) on which the camera system is mounted or ii) a fixed location (932) corresponding to a camera in said system (e.g., from the front center of a camera used as a reference camera) or iii) to an object visible to the cameras in said system.

System Embodiment 38. The system of System Embodiment 27, wherein each target (915, 917, 919, 921) in the one or more targets includes a known pattern (e.g., AprilTag 4000) of a known size and shape.

System Embodiment 39. The system of System Embodiment 38, wherein the known pattern of one or more different targets (915, 917, 919, 921) are different (e.g., each target has a different AprilTag) allowing identification of the individual different targets (915, 917, 919, 921) in the captured images.

System Embodiment 40. The system of System Embodiment 38, wherein said one or more targets (915, 917, 919, 921) are mounted to a first rigid part (e.g., hood (907)) of said vehicle (600) and wherein said plurality of cameras is mounted at a second rigid part (e.g., dashboard or portion of a windshield (901)) of said vehicle (600).

System Embodiment 41. The system of System Embodiment 27, wherein said first and second rigid parts (907, 901) of said vehicle (600) remain in fixed positions with respect to a reference point of the vehicle and relative to each other, during vehicle use.

System Embodiment 42. The system of System Embodiment 41, wherein said one or more targets (915, 917, 919, 921) are at fixed distances from said plurality of cameras (906, 908) (e.g., each target (915, 917, 919, 921) being a fixed distance from a reference point (923) corresponding to the set of cameras (906, 908).

System Embodiment 43. The system of System Embodiment 27, wherein each target (915, 917, 919, 921) includes a pattern (e.g., AprilTag pattern 4001).

System Embodiment 44. The system of System Embodiment 43, further comprising: an IR Emitter (613) for illuminating the targets (915, 917, 919, 921).

System Embodiment 45. The system of System Embodiment 43, wherein said pattern (4001) is not visible to a driver (605) sitting in a driver's seat (603) of the vehicle (600).

System Embodiment 46. The system of System Embodiment 45, wherein said pattern (4001) includes an infrared pattern which can be detected by cameras (906, 908) in said plurality of cameras but is not visible to a human eye.

System Embodiment 47. The system of System Embodiment 45, wherein said pattern (4001) is a QR code or April Tag.

System Embodiment 48. The system of System Embodiment 47, wherein said pattern (4001) is covered by a horizontally extending light shield (991).

System Embodiment 49. The system of System Embodiment 48, wherein said patten (4001) is blocked from driver view by a shield (992, 993, 991 or 915) blocking view of the pattern by the driver (605) of the vehicle (600).

System Embodiment 50. The system of System Embodiment 48, wherein the pattern (4001) is shielded from light from the driver's side of the vehicle (600) by a first side shield (992) and shielded from light from the passenger side of the vehicle by a second side shield (992) and shielded from light from above by a top shield (991).

System Embodiment 51. The system of System Embodiment 50, wherein said targets (915, 917, 919, 921) are non-transparent or mounted on a non-transparent surface (997) blocking light from oncoming vehicles passing through said targets (915, 917, 919, 921).

System Embodiment 52. The system of System Embodiment 50, wherein said top (991), first (992) and second (993) side shields form one or more recessed areas (999) in which said one or more calibration targets (915, 917, 919, 921) are located (note that the surface (997) is used to indicate the surface for the recessed area (999) on which the targets are mounted and which is a solid surface obstructing light from vehicles on a road or facing toward the windshield (901) and cameras (906, 908) mounted on the vehicle (600), said one or more recessed areas (999) being visible to said plurality of cameras (906, 908).

NUMBERED LIST OF EXEMPLARY
NON-TRANSITORY COMPUTER READABLE
MEDIUM EMBODIMENTS

Non-Transitory Computer Readable Medium Embodiment 53. A non-transitory computer readable medium (604 or 1012) including processor executable instructions which, when executed by a processor (602 or 1002 or 1004) of a vehicle (600 or 1000) including a plurality of cameras (906, 908), mounted on the vehicle (600), and one or more targets (915, 917, 919, 921), mounted on the vehicle (600), cause the processor (602 or 1002 or 1004) to: control the plurality of cameras (906, 908) to capture images (10002, 10004) at the same time, said captured images (10002, 10004) including images (915', 917', 919', 921', 915", 917", 919", 921") of one or more targets (915, 917, 919, 921), said one or more targets (915, 917, 919, 921) being positioned in the field of view of said cameras (906, 908); perform a calibration operation based on the captured images to generate one or more calibration parameters; and make one or more stereoscopic depth determinations based on the captured images and one or more calibration parameters generated from said calibration operation, said one or more stereoscopic depth determinations generating depth information indicating distance information to one or more objects (957, 959).

Non-Transitory Computer Readable Medium Embodiment 54. The non-transitory computer readable medium (604 or 1012) of Non-Transitory Computer Readable Medium Embodiment 53, further comprising: additional processor executable instructions which when executed by the processor cause the processor (602 or 1002 or 1004) to automatically control vehicle operation (e.g., braking, turning and/or acceleration) based on determined depths.

Numerous additional variations on the methods and apparatus of the present invention described above will be apparent to those skilled in the art in view of the above description of the invention. For example, while described in the context of a vehicle mounted system the methods and apparatus which are used for system calibration can be used for stationary applications, e.g., where an area is monitored and depth information is used for security or control applications. In such a case the steps of the method would be the same or similar but the system and target would be stationary and an alarm, door, manufacturing, safety or other system would be controlled based on the depth determinations that were made by the camera system.

The order of steps is in various flow diagrams is intended to be exemplary and not limiting and to the extent that the steps can be performed in another order such other orders are contemplated and within the scope of this disclosure.

It should be appreciated that images can be captured at different times, e.g., sequentially by different sets of cameras and/or at the same time, e.g., with multiple but not necessarily all cameras being controlled to capture images at the same time in many cases. In many cases where depth map or depth information is to be generated, the images which are compared, e.g., reference image captured by a reference and images captured by other cameras in the system, the images which are captured to one another are captured at the same time, e.g., in parallel. In this way the images correspond to the vehicle location at the time the set of images are captured.

The techniques of the present invention may be implemented using software, hardware and/or a combination of software and hardware. The present invention is directed, among other things, to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits to as modules alone or in combination with other hardware elements. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform one or more of the steps of the above-described method(s).

While described in the context of an apparatus, e.g., vehicle including cameras, at least some of the methods and apparatus of the present invention, are applicable to a wide range of image captures systems and devices including tablet and cell phone devices which support or provide image capture functionality and/or stationary devices or systems.

Captured images and/or composite images may be and sometimes are displayed or sent to a printer for printing as a photo or permanent document which can be maintained in a file as part of a vehicle, personal or business record. Such records can be and sometimes are useful in documenting vehicle operation.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Various variations are to be considered within the scope of the invention. In various embodiments the cameras are implemented as digital cameras as part of a system that includes one or more wipers, receiver/transmitter circuits and logic and/or routines, for implementing the methods of the present invention and/or for transiting captured images or generated composite images or depth maps to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain, e.g., chain being fixed with, in at least some embodiments the covering being a windshield of a vehicle.

Numerous additional embodiments are possible while staying within the scope of the above discussed features.

What is claimed is:

1. A vehicle control method comprising:
operating a plurality of cameras mounted on a vehicle to capture images at the same time, said captured images including images of one or more targets mounted on said vehicle, said one or more targets being positioned in an area formed from a left side light shield, a right side light shield, a top light shield, and a back surface that obstructs light coming from in front of the vehicle or above said vehicle that is directed towards a forward facing portion of the back surface from passing into said area, said one or more targets being in the field of view of said cameras;
performing a calibration operation based on the captured images to generate one or more calibration parameters; and making one or more stereoscopic depth determinations based on the captured images and one or more calibration parameters generated from said calibration operation, said one or more stereoscopic depth determinations generating depth information indicating distance information to one or more objects.

2. The method of claim 1, further comprising:
automatically controlling vehicle operation based on determined depths.

3. The method of claim 1, wherein said one or more targets include a first row of targets including at least two targets.

4. The method of claim 3, wherein said at least two targets are positioned on a first horizontal line extending parallel relative to a line along which two cameras in said plurality of cameras are mounted in said vehicle.

5. The method of claim 3, wherein said one or more targets further include a second row of targets including at least two targets.

6. The method of claim 1, wherein two cameras of said plurality of cameras use rolling shutter based sensors to capture images of said one or more targets.

7. The method of claim 5, wherein said first and second rows of targets are mounted on said vehicle at different locations and correspond to the field of view of different portions of first and second sensors.

8. The method of claim 7, wherein at least a portion of said first row of targets are captured at different times by different portions of the sensors of said two cameras than at least a portion of said second row of targets.

9. The method of claim 1, further comprising:
generating a depth map providing distance information to objects in one or more of said captured images, said depth map indicating a distance for each pixel of an image including at least one of said one or more objects.

10. The method of claim 9, further comprising:
automatically controlling vehicle operation based on the generated depth map.

11. The method of claim 9, wherein each distance is a distance from i) a fixed point determined with reference to said vehicle on which the plurality of cameras are mounted, ii) a fixed location corresponding to a camera in said plurality of cameras or iii) to an object visible to the cameras in said plurality of cameras.

12. The method of claim 1, wherein each target in the one or more targets includes a known pattern of a known size and shape.

13. The method of claim 12, wherein the known pattern of one or more different targets are different allowing identification of the individual different targets in the captured images.

14. The method of claim 12, wherein said one or more targets are mounted to a first rigid part of said vehicle and wherein said plurality of cameras is mounted at a second rigid part of said vehicle.

15. The method of claim 14, wherein said first and second rigid parts of said vehicle remain in fixed positions with respect to a reference point of the vehicle and relative to each other, during vehicle use.

16. The method of claim 14, wherein said one or more targets are at fixed distances from said plurality of cameras.

17. The method of claim 1, wherein each target includes a pattern.

18. The method of claim 17, further comprising:
operating an IR emitter to illuminate the targets.

19. The method of claim 17, wherein said pattern is not visible to a driver sitting in a driver's seat of the vehicle.

20. The method of claim 19, wherein said pattern includes an infrared pattern which can be detected by cameras in said plurality of cameras but is not visible to a human eye.

21. A system comprising:

a vehicle;

a plurality of cameras mounted on said vehicle;

one or more targets mounted on said vehicle, said one or more targets being positioned in an area formed from a left side light shield, a right side light shield, a top light shield, and a back surface that obstructs light coming from in front of the vehicle or above said vehicle that is directed towards a forward facing portion of the back surface from passing into said area, said one or more targets being in the field of view of said cameras; and a processor configured to:

i) control the cameras to capture images at the same time, said captured images including images of one or more targets;

ii) perform a calibration operation based on the captured images to generate one or more calibration parameters; and iii) make one or more stereoscopic depth determinations based on the captured images and one or more calibration parameters generated from said calibration operation, said one or more stereoscopic depth determinations generating depth information indicating distance information to one or more objects.

22. The system of claim 21, wherein said processor is further configured to automatically control vehicle operation based on determined depths.

23. The system of claim 21, wherein said one or more targets include a first row of targets including at least two targets.

24. The system of claim 23, wherein said at least two targets are positioned on a first horizontal line extending parallel relative to a line along which two cameras in said plurality of cameras are mounted in said vehicle.

25. The system of claim 23, wherein said one or more targets further include a second row of targets including at least two targets.

26. The system of claim 21, wherein two cameras of said plurality of cameras include rolling shutter based sensors for capturing images of said one or more targets.

27. The system of claim 25, wherein said first and second rows of targets are mounted on said vehicle at different locations and correspond to the field of view of different portions of first and second sensors.

28. The system of claim 26, wherein at least a portion of said first row of targets are captured at different times by different portions of the sensors of said two cameras than at least a portion of said second row of targets.

29. The system of claim 21, wherein the processor is further configured to:

generate a depth map providing distance information to objects in one or more of said captured images, said depth map indicating a distance for each pixel of an image including at least one of said one or more objects.

30. A non-transitory computer readable medium including processor executable instructions which, when executed by a processor of a vehicle including a plurality of cameras, mounted on the vehicle, and one or more targets, mounted on the vehicle, cause the processor to:

control the plurality of cameras to capture images at the same time, said captured images including images of one or more targets, said one or more targets being positioned in an area formed from a left side light shield, a right side light shield, a top light shield, and a back surface that obstructs light coming from in front of the vehicle or above said vehicle that is directed towards a forward facing portion of the back surface from passing into said area, said one or more targets being in the field of view of said cameras;

perform a calibration operation based on the captured images to generate one or more calibration parameters; and make one or more stereoscopic depth determinations based on the captured images and one or more calibration parameters generated from said calibration operation, said one or more stereoscopic depth determinations generating depth information indicating distance information to one or more objects.

* * * * *